F. SCHILKE.
CAMPING BED.
APPLICATION FILED MAY 20, 1920.
1,370,227.                              Patented Mar. 1, 1921.
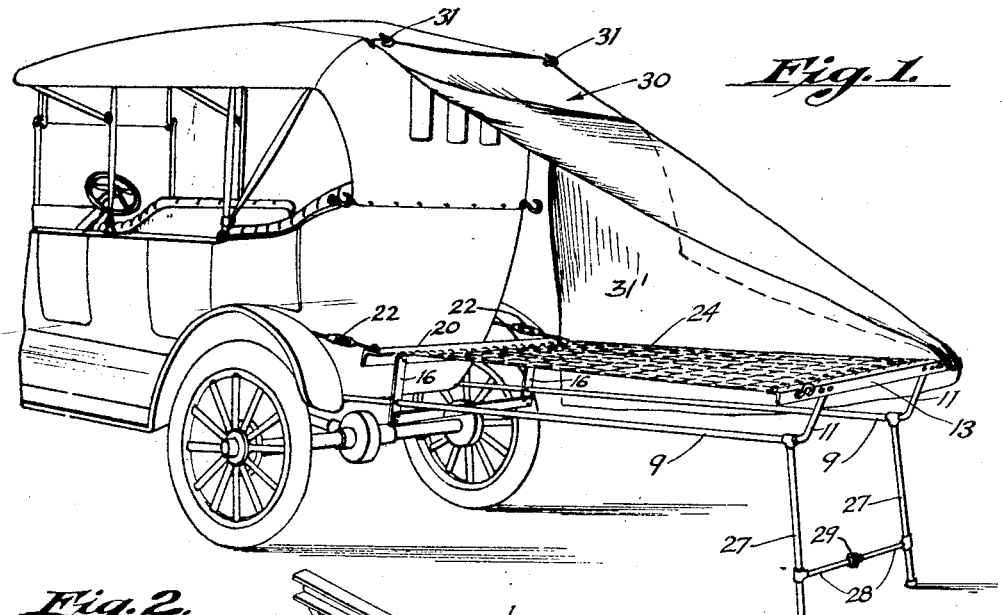
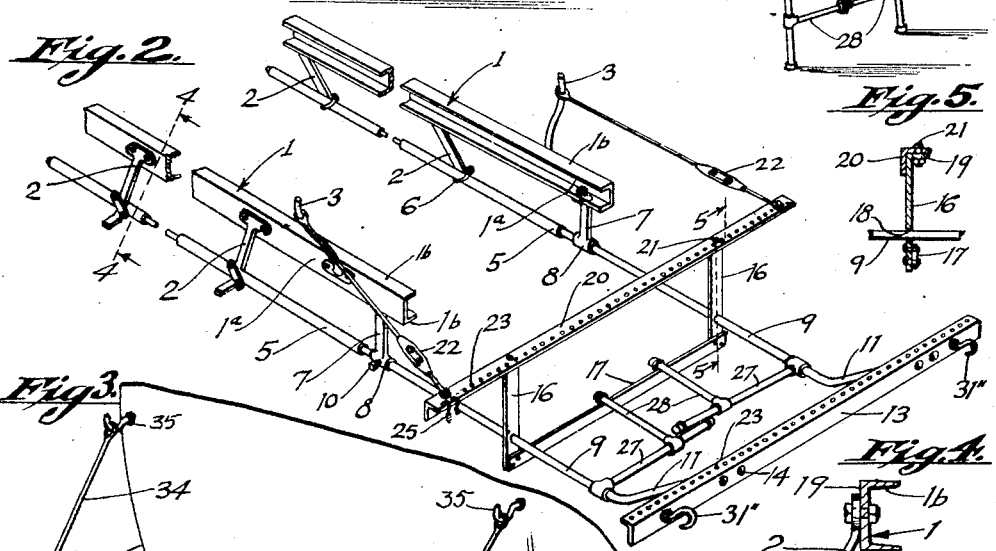
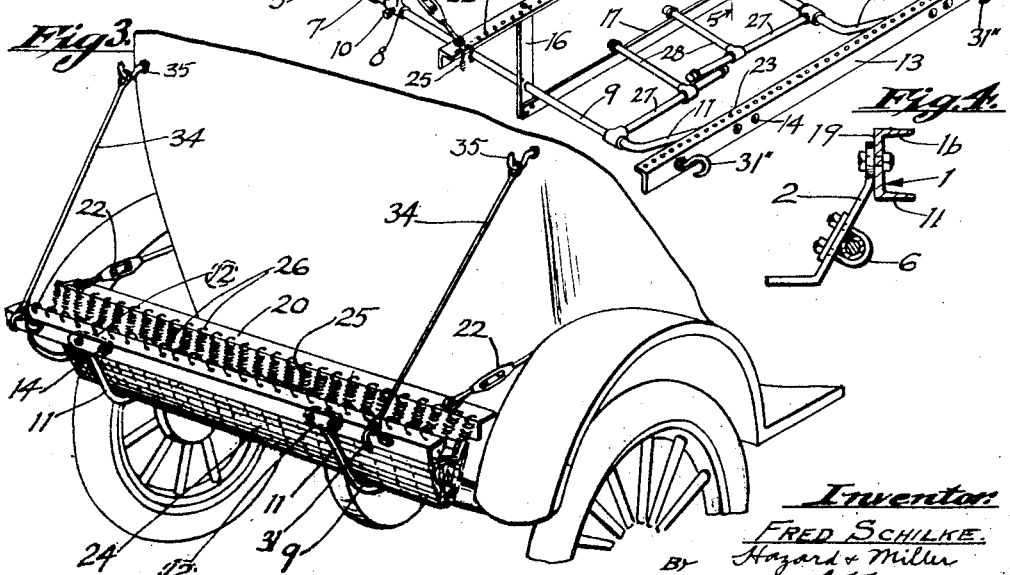
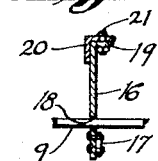
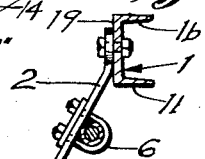
Inventor:
FRED SCHILKE.
By Hazard & Miller
Attorneys

UNITED STATES PATENT OFFICE.

FRED SCHILKE, OF OATMAN, ARIZONA.

CAMPING-BED.

1,370,227.

Specification of Letters Patent.  Patented Mar. 1, 1921.

Application filed May 20, 1920. Serial No. 382,797.

*To all whom it may concern:*

Be it known that I, FRED SCHILKE, a citizen of the United States, residing at Oatman, in the county of Mohave and State of Arizona, have invented new and useful Improvements in Camping-Beds, of which the following is a specification.

This invention is a camping bed particularly adapted to be used upon a motor vehicle, and has for its object the provision of a bed construction which when not in use may be carried beneath the body of an automobile, and which when it is desired to use the same may be withdrawn beyond the automobile.

It is a further object of the invention to provide a bed construction of this character which may have a tent covering used in connection therewith, the tent covering being attached to the automobile and to the bed frame.

It is a still further object of the invention to provide a construction which when in inoperative position will provide a convenient luggage rack.

The invention will be readily understood from the following description of the accompanying drawings, in which—

Figure 1 is a perspective view showing the improved bed construction in operative position.

Fig. 2 is a perspective view showing a portion of the vehicle frame and the frame of the bed with the latter moved part way in inoperative position.

Fig. 3 is a perspective view of the vehicle showing a bed construction in inoperative position.

Figs. 4 and 5 are detail sections on the lines 4—4 and 5—5 of Fig. 2.

The improved camping bed is illustrated as employed in connection with an automobile having the side frames 1 from which are suspended the running board brackets 2. The bracket for supporting the rear mud guard of the automobile is shown at 3 as extending upwardly from the side frame 1 in usual manner. The side frames 1 may consist of the usual channel bar construction, said channel bars including a base 1ª arranged in upright position and flanges 1ᵇ horizontally positioned.

The camping bed is supported by tubes 5 extending lengthwise of the automobile frame beneath said frames 1, these tubes being, preferably, supported by U-bolts 6 from the running board brackets 2. The tubes, preferably, terminate short of the rear end of the frame of the automobile, and brackets 7 are, preferably, suspended from the side frames 1 at the rear ends of said side frames beyond the tubes 5, these brackets being provided with bearings 8 in alinement with tubes 5 and through which the side frames of the bed construction are arranged to extend.

The improved bed comprises side frames 9 arranged to extend through the respective bearings 8 and into the tubes 5 in alinement therewith, the side frames being slidable lengthwise of said tubes and bearings for positioning the bed frame beneath the automobile or withdrawing the bed frame beyond the rear end of the automobile. The side frames may be clamped in bearings 8 by set screws 10 so that the bed frame may be retained in either its operative or inoperative position. The rear ends of the side frames 9, preferably, extend upwardly as shown at 11 to provide supports for the spring frame of the bed. These upward extensions of the side rods, preferably, terminate in brackets 12 upon which the end bar 13 of the spring frame is mounted as by bolts 14.

The construction at the opposite end of the spring frame, preferably, includes supporting brackets 16 connected at their lower ends by a cross bar 17 and having bearing openings 18 therein through which the respective side rods 9 are slidable. The upper ends of supports 16 terminate in brackets 19 upon which the cross bar 20 for this end of the spring frame is mounted as by bolts 21.

By the construction, as thus described, it will be seen that the supporting frame for this end of the spring frame of the bed is slidable along the side rods 9, and when the side rods 9 are extended to their operative position the supporting frame 16 is adjusted along the rods 9 so as to space the respective ends of the spring frame. For this purpose a turnbuckle 22 is connected at its respective ends to the cross bar 20 and to the fender support 3 of the automobile frame so that turning of the turnbuckle will position the supporting frame 16 toward and away from the supporting frame at the opposite end of the spring frame construction.

The cross bars 13 and 20 are, preferably, angle irons having the horizontal angles thereof provided with suitable apertures 23 along the length of said cross bars. A usual spring construction comprising crossed wires 24 and having coil springs 25 at the respective ends of the spring construction is arranged to be mounted between the cross bars 13 and 20 as by providing hooks 26 upon the ends of springs 25 which are received within the respective apertures 23.

The rear ends of the side rods 9 may be supported by legs 27 rotatably mounted upon the side rods 9 and arranged to be swung downwardly into supporting position in engagement with the ground. Cross rods 28, preferably, connect the legs 27 adjacent their swinging ends, these cross rods being pivoted on the legs and having a detachable connection as by the screw threaded union 29.

When the improved bed, as thus constructed, is extended into operative position, as shown in Fig. 2, a tent canopy 30 is arranged to be suspended above the bed as upon hooks 31 at the rear upper edge of the top of the automobile and at the cross bar 13 of the bed construction. The sides 31' of the tent may extend downwardly at the sides of the bed to provide a closed tent above the bed.

When the bed is not in use the set screws 10 are loosened and the side rods 9 are telescoped within tubes 5 so as to position the bed frame beneath the automobile frame. The spring construction 24 of the bed will fold within the space between the rear ends of side rods 9 and the supporting bracket 16, as clearly shown in Fig. 3, and the legs 27 may be swung upon side rods 9 into substantially horizontal position, as shown in Fig. 2. When in this position the cross rods 28 may rest upon cross bars 17 for retaining the legs in position.

If desired supporting means shown as flexible connections 34 may be connected to the rear end of the bed frame and the body of the automobile, these flexible connections being shown as secured to the hooks 31'' upon the cross bar 13 and to suitable hooks 35 positioned upon the rear of the automobile body. When the bed is to be used the flexible connections 34 are removed and the side rods 9 are extended beyond the rear of the automobile and secured in position by set screws 10; and the legs 27 swung downwardly so as to engage the ground for supporting the rear end of the bed, and the legs are then again connected by the rods 28.

The tension of the spring frame supported between cross bars 13 and 20 may be adjusted by adjustment of cross bar 20 along side rails 9 by means of the turnbuckle 22, as previously described. The tent canopy then being positioned above the bed, as thus formed, a structure is provided which forms a convenient camping bed having a tent closure completely inclosing the same.

Various changes may be made without departing from the spirit of the invention as claimed.

What is claimed is:

1. The combination with a vehicle frame, of a camping bed supported by said frame and arranged to be shifted longitudinally relative to said frame from inoperative position beneath the latter to position for use beyond the frame, legs pivoted to the sides of said bed and cross rods pivoted to said legs and having a coupling connection, said legs being arranged to be swung from inoperative position alongside said bed, when the latter is in inoperative position, to ground engaging position below said bed when the latter is in position for use.

2. The combination with a vehicle frame, of a camping bed supported by said frame and arranged to be shifted longitudinally relative to said frame from inoperative position beneath the latter to position for use beyond the frame, and a spring frame carried by said bed, one end of said spring frame being adjustably connected to said vehicle frame and slidable along said bed frame for tensioning said springs.

3. The combination with a vehicle having side frames, of supporting tubes suspended from said side frames, side rods telescoping within said tubes, and a bed spring frame having one end connecting the ends of said side rods, the other end of said bed spring frame having said side rods shiftable therethrough, and connecting means for adjusting the last mentioned end of the bed spring frame with relation to the vehicle and also with relation to the opposite end of the bed spring frame.

In testimony whereof I have signed my name to this specification.

FRED SCHILKE.